(12) United States Patent
Hsu

(10) Patent No.: US 7,134,180 B2
(45) Date of Patent: Nov. 14, 2006

(54) METHOD FOR PROVIDING SLIP ENERGY CONTROL IN PERMANENT MAGNET ELECTRICAL MACHINES

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/228,679

(22) Filed: Sep. 16, 2005

(65) Prior Publication Data

US 2006/0028084 A1    Feb. 9, 2006

Related U.S. Application Data

(62) Division of application No. 10/706,577, filed on Nov. 12, 2003, now Pat. No. 6,977,454.

(51) Int. Cl.
*H02K 15/00* (2006.01)
*H02K 17/42* (2006.01)

(52) U.S. Cl. ............... 29/596; 29/598; 310/114; 310/171; 310/266; 310/268

(58) Field of Classification Search ............... 29/296, 29/598; 310/180, 184, 114, 171, 105, 206, 310/107, 210, 256, 266, 268, 166, 168, 68 B
See application file for complete search history.

(56) References Cited

U.S. PATENT DOCUMENTS

| | | | | |
|---|---|---|---|---|
| 3,069,577 A * | 12/1962 | Lee | ............................. | 310/166 |
| 6,310,417 B1 * | 10/2001 | Hsu | ............................. | 310/112 |
| 6,841,916 B1 * | 1/2005 | Chiarenza | ................... | 310/254 |
| 6,891,301 B1 * | 5/2005 | Hsu | ............................. | 310/171 |
| 6,922,000 B1 * | 7/2005 | Kusase et al. | ......... | 310/156.53 |
| 2004/0232794 A1 * | 11/2004 | Hsu | ...................... | 310/156.56 |

* cited by examiner

*Primary Examiner*—Peter Vo
*Assistant Examiner*—Livius Radu Cazan
(74) *Attorney, Agent, or Firm*—Quarles & Brady LLP (57) ABSTRACT

An electric machine (40) has a stator (43), a permanent magnet rotor (38) with permanent magnets (39) and a magnetic coupling uncluttered rotor (46) for inducing a slip energy current in secondary coils (47). A dc flux can be produced in the uncluttered rotor when the secondary coils are fed with dc currents. The magnetic coupling uncluttered rotor (46) has magnetic brushes (A, B, C, D) which couple flux in through the rotor (46) to the secondary coils (47c, 47d) without inducing a current in the rotor (46) and without coupling a stator rotational energy component to the secondary coils (47c, 47d). The machine can be operated as a motor or a generator in multi-phase or single-phase embodiments and is applicable to the hybrid electric vehicle. A method of providing a slip energy controller is also disclosed.

8 Claims, 9 Drawing Sheets
(3 of 9 Drawing Sheet(s) Filed in Color)

PRIOR ART

FIG. 1

PRIOR ART

FIG. 2

PRIOR ART

FIG. 3

PRIOR ART

FIG. 4

PRIOR ART

METHOD FOR PROVIDING SLIP ENERGY CONTROL IN PERMANENT MAGNET ELECTRICAL MACHINES

This application is a Divisional of U.S. patent application Ser. No. 10/706,577, filed Nov. 12, 2003 now U.S. Pat. No. 6,977,454.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both ac and dc machines, including both motors and generators, and including induction machines, permanent magnet (PM) machines and switched reluctance machines.

DESCRIPTION OF THE BACKGROUND ART

A brushless doubly-fed induction motor (BDFIM) has two sets of stator windings for two p-poles and two q-poles. The rotor winding has a nested cage with 2(p+q) poles. It produces a motor control with a relatively narrow range of speed control. The existing extended rotor cage technology has a drawback in that both rotational and slip energy are transferred in a cluttered approach to energy transfer.

An induction machine may be viewed as a transformer with its stator as the primary and the rotor as the secondary. A slip-ring wound-rotor induction motor, with a secondary winding is connected through a set of slip rings and brushes, has been known for decades. By changing the resistance connected to the brushes, the starting current and the speed of the motor can be changed. However, maintenance of a motor with slip rings and brushes is expensive.

It is generally agreed that the most significant energy savings for electric motor drives comes from the adjustable speed drive and that the motor plays a relatively less significant role. The high cost of adjustable speed drives fed by an adjustable-frequency inverter discourages many potential users. There are many other known adjustable speed methods. The brushless doubly-fed motor (BDFM) provides an adjustable-speed control having a lower initial cost than other alternatives.

Hsu, U.S. Pat. No. 6,310,417, issued Oct. 30, 2001, disclosed a hybrid-secondary uncluttered induction machine that has a significant potential to lower the cost of adjustable-speed drives. In addition to speed control below synchronous speed, this machine may also be operated above synchronous speed.

The term "hybrid secondary" as it relates to such a machines implies that several secondary circuits can be used in various combinations for different applications. Examples of such secondary circuits are a variable resistance circuit, an inverter circuit for doubly-fed operation, and a generator circuit.

The term "uncluttered coupling" relates to a stator and rotor that couple slip energy. In an induction motor, the speed of the rotating stator field equals the sum of 1) the speed of the rotating rotor field plus 2) the mechanical rotation speed of the rotor. With the motor running at maximum torque and close to synchronous speed, rotor speed is high and slip (the difference between the speed of the rotating stator field and the rotational speed of the rotor) is small, about 3 to 10 percent, and the slip frequency induced in the rotor is small, perhaps two to six cycles per second for a 60 Hz motor.

To couple only slip energy, the stator and rotor have coils that run circumferentially, sometimes referred to as "peripherally," around the axis of rotor rotation. The peripheral coils of the rotor and stator are magnetically coupled. The rotor coil rotates and carries a slip-frequency current. Because the rotation does not change the total magnetic flux linking both the rotor and stator coils, no electromotive force (emf) is induced in the stator coil due to the rotation of the rotor coil. This "uncluttered coupling" allows only the slip energy power corresponding to the slip-frequency currents to be transferred between the rotor and stator coils of the transformer.

It is desired to make such a machine that is more compact and has fewer parts while still providing a source of slip energy for speed control.

SUMMARY OF THE INVENTION

This invention provides a multiple-rotor permanent-magnet (PM) machine with a rotor that couples a slip flux to one or more secondary coils through a magnetic coupling uncluttered rotor. Consequently, for the applications such as the hybrid electric vehicles (HEV) that require two individual machines, the size and cost saved by using a single machine is significant. The invention eliminates the main rotor and the auxiliary rotor with windings which were present and electrically connected in the prior art. The stator and slip energy rotor are now magnetically coupled and a slip energy source is provided by peripheral secondary coils in which slip current is induced through the magnetic coupling uncluttered rotor without rotor windings.

The invention relates to an electric induction machine comprising a stator having coils for receiving ac electrical power to provide a magnetic field; a permanent magnet rotor spaced from the stator to define a first air gap relative to an axis of rotation for the permanent magnet rotor; a magnetic coupling uncluttered rotor spaced from the permanent magnet rotor to define a second air gap relative to an axis of rotation for the permanent magnet rotor; and at least one stationary core and secondary coil spaced from the magnetic coupling uncluttered rotor by a third air gap. The magnetic coupling uncluttered rotor is provided with a plurality of magnetic elements for coupling flux to the secondary coil, and the secondary coil is disposed around an axis of rotation for the rotor to allow induction of a slip energy current in the coil without inducing a rotational energy current.

In the new approach, the PM rotor, the magnetic coupling uncluttered rotor, and the secondary coil(s) form an uncluttered slip energy machine except the PM rotor is acting as an armature that produces either a rotating or a standstill flux wave between the PM rotor and the uncluttered rotor. For example, when the PM rotor is at standstill, the currents in the secondary coil(s) can produce a torque between the PM rotor and the magnetic coupling uncluttered rotor. Under a relative rotation between the magnetic coupling uncluttered rotor and the PM rotor, the secondary coil(s) can act as either a generator or a motor depending on the direction of current in the coils.

The new approach does not require a rotor winding in either rotor to produce the slip-frequency currents that are subsequently fed to the coil(s) of a peripheral transformer. The function of the new rotors are to directly transform the rotating air-gap flux originated by the PM rotor to the uncluttered flux seen by the stationary secondary coils.

The invention is also practiced in a method of providing slip energy control in an electrical machine, the method comprising inducing a flux in a magnetic coupling uncluttered rotor across an air gap by conducting a current in a primary winding of the stator and by positioning a permanent magnet rotor with permanent magnets in said air gap; positioning a secondary coil across a second air gap from the rotor; and inducing a slip current in the secondary coil by magnetically coupling the flux through the magnetic coupling uncluttered rotor without inducing a current in the magnetic coupling uncluttered rotor.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
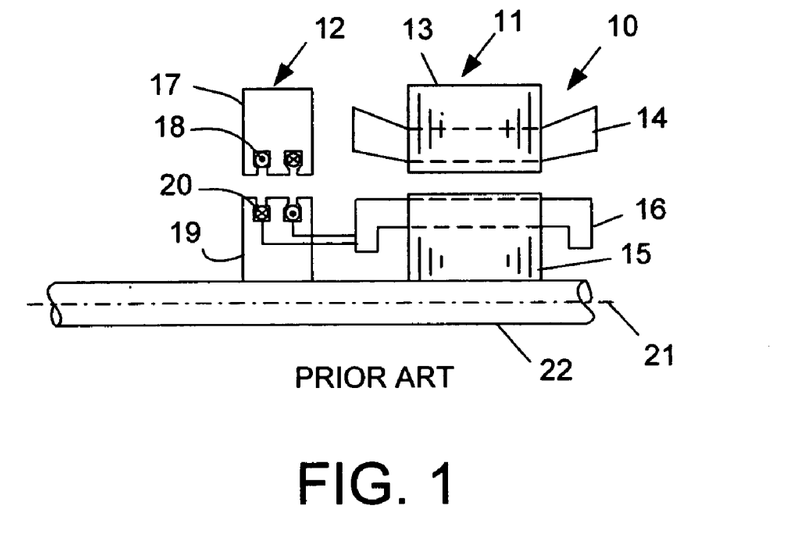
FIG. 1 is a schematic view of a hybrid-secondary uncluttered machine of the prior art.

FIG. 1 illustrates an assembly 10 of an induction motor 11 of the prior art that includes an uncluttered transformer 12 for providing a hybrid secondary. A stator core 13 of the motor 11 is wound with a polyphase winding 14. A rotor core 15 of the motor is wound with a two-phase winding 16. One or more conductors of cast aluminum can also be used on the rotor 15. To the left is a two-phase uncluttered rotating transformer 12. The stator 17 and stator coils 18 of this transformer do not connect to the stator winding 14 of the motor or to the rotor 19 of the transformer 12, but instead are magnetically coupled to the rotor 19 of the transformer 12. The stator 17 and the rotor 19 of the transformer 12 have coils 18, 20 that are peripherally disposed around the axis of rotation 21 for the motor 11 and the transformer 12. The electrical connection of the machine rotor 15 to the transformer rotor 19 allows only the slip energy to be present in the rotor 19 of the transformer 12, and this slip energy is coupled to the stator 17 of the transformer 12, which has windings for supplying this energy to another device.

Figure 2:
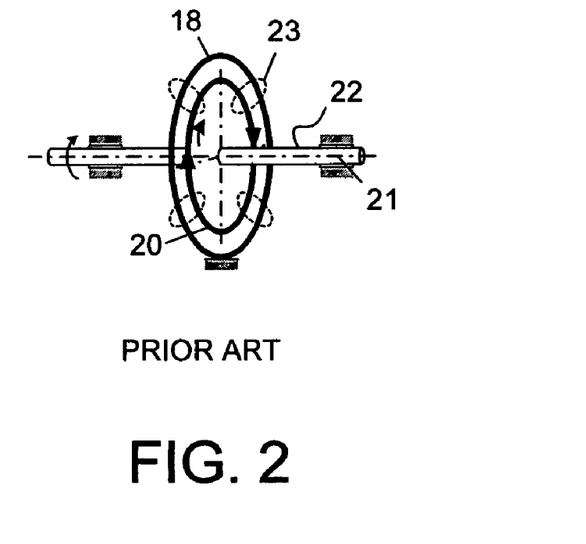
FIG. 2 is a schematic view illustrating the operation of the machine of FIG. 1.

FIG. 2 shows a schematic of the peripherally wound stator coil 18 and the peripherally wound rotor coil 20 that carries a slip energy current. Magnetic flux 23 is coupled between the stator coil 18 and the rotor coil 20. The rotor 19 rotates with the motor shaft 22 but the stator 17 is stationary. The rotation of the rotor 19 does not induce any additional energy beyond the slip energy in the rotor 19, so only the slip energy is coupled to the stator coil 18 of the transformer 12 in FIG. 1.

Figure 4:
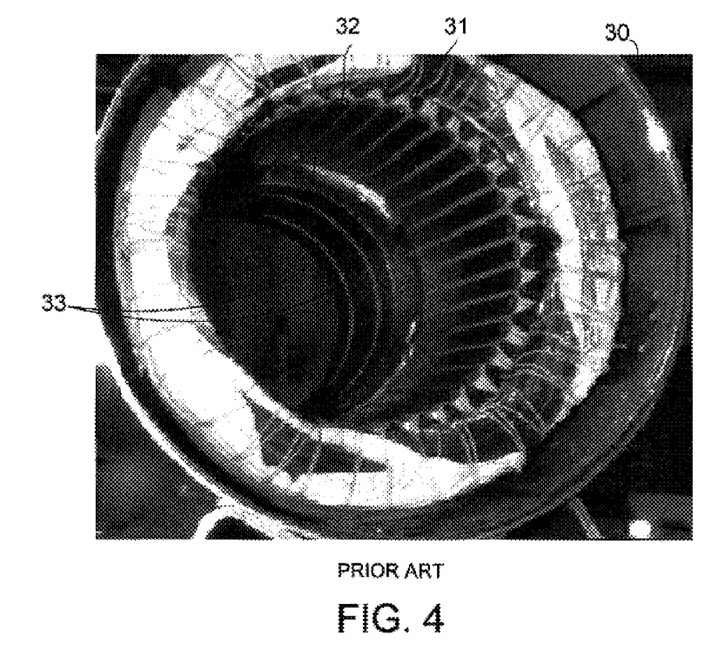
FIG. 4 is a perspective view of an inside of a dual stator in a hybrid-secondary uncluttered machine of the prior art.
Figure 5:
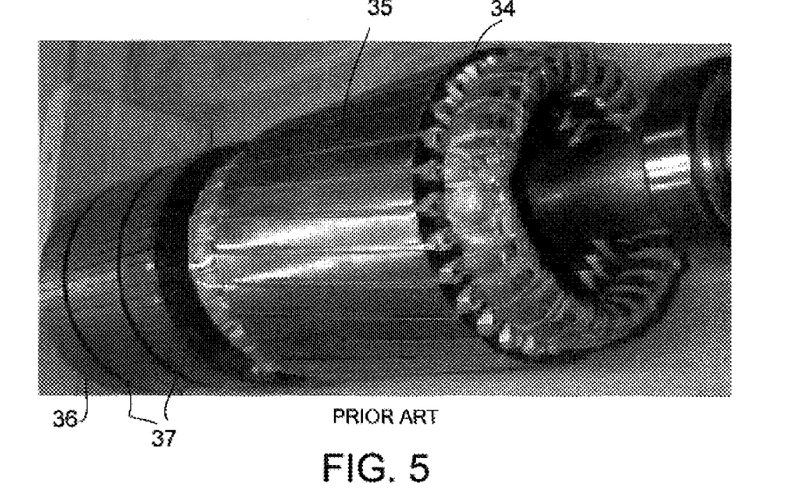
FIG. 5 is a perspective view of a dual rotor in hybrid-secondary uncluttered machine of the prior art.

FIGS. 4 and 5 show a physical example of the peripherally disposed coils. FIG. 4 shows a machine housing 30 with the rotor removed to expose the motor stator 31 and the transformer stator 32. The transformer stator 32 exhibits the peripherally disposed coils 33 in FIG. 4. FIG. 5 shows the induction motor rotor 34 with rotor teeth 35 and the transformer rotor 36 with peripherally disposed coils 37.

Figure 3:
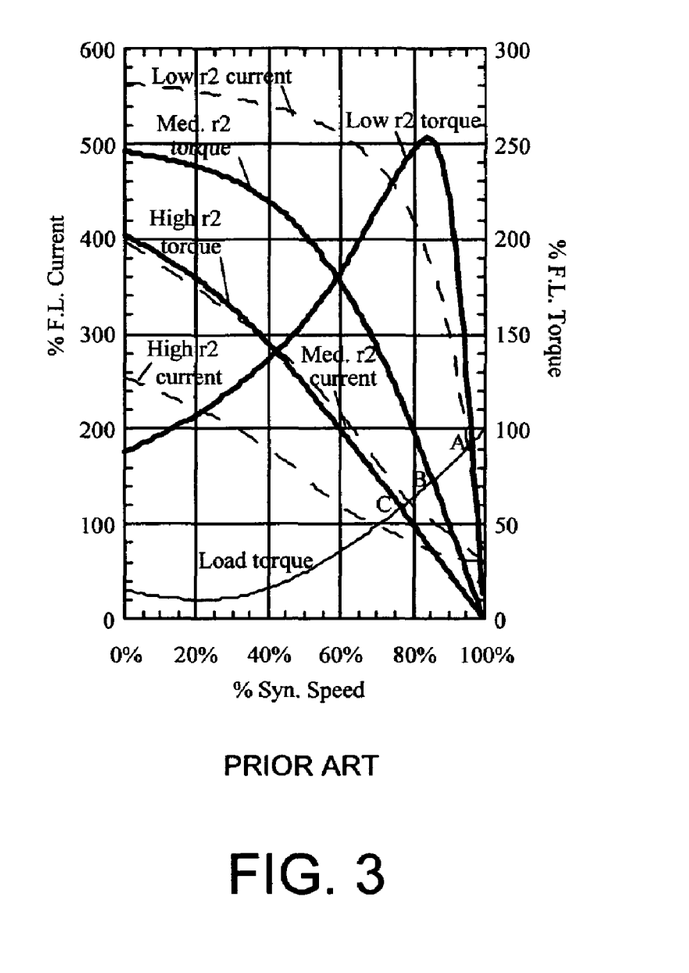
FIG. 3 is a multi-graph of current and torque for high and low resistance for pump and fan loads.

The hybrid secondary uncluttered induction machine portion used in the present invention is advantageous for controlling fan and pump loads, as well as being suitable to be incorporated into the drive train of electric or hybrid electric vehicles. Fan and pump loads represent two thirds of the motor drives in industry. The required adjustable speed range and the load torque versus speed curve as showed in FIG. 3, dictate the rating of the slip power controller of an induction motor.

For a fan load without or with a backpressure, the required fan power may be proportional to the cube or to the square of speed, respectively. Assuming unity efficiency and power factor, the per-unit slip power for these two examples may be roughly estimated as.

TABLE 1

Example of per-unit slip powers of fan loads
(per unit slip power) ≈ slip · $(1 - \text{slip})^{3 \text{ or } 2}$ (1)

| Based on stator | Per unit slip power | |
|---|---|---|
| rotating field slip | W/o back pressure slip$(1 - \text{slip})^3$ | With back pressure slip$(1 - \text{slip})^2$ |
| −0.2 | −0.346 | −0.288 |
| −0.1 | −0.133 | −0.121 |
| 0 | 0 | 0 |
| 0.01 | 0.0097 | 0.0098 |
| 0.1 | 0.0729 | 0.081 |
| 0.3 | 0.1029 | 0.147 |

TABLE 1-continued

Example of per-unit slip powers of fan loads
(per unit slip power) ≈ slip · (1 − slip)$^{3 \text{ or } 2}$ (1)

| Based on stator | Per unit slip power | |
|---|---|---|
| rotating field slip | W/o back pressure slip(1 − slip)$^3$ | With back pressure slip(1 − slip)$^2$ |
| 0.5 | 0.0625 | 0.125 |
| 0.7 | 0.0189 | 0.063 |
| 0.9 | 0.0009 | 0.009 |
| 1.0 | 0 | 0 |

Table 1 shows that the rating of the positive slip power of a fan load is generally low for speeds below synchronism. Subsequently, even with consideration of the non-unity of power factor and efficiency, the required rating of the control for speed adjustment is low. This enables the use of a very small power electronics module or small adjustable resistors to control a motor with a high power rating. These energy absorption approaches can be characterized as an effective resistance approach.

In order to control the rotor slip energy of an induction motor that has no slip rings, the rotor current must be coupled to a stationary control circuit through a rotating transformer of the type illustrated in FIG. 1.

Figure 6:
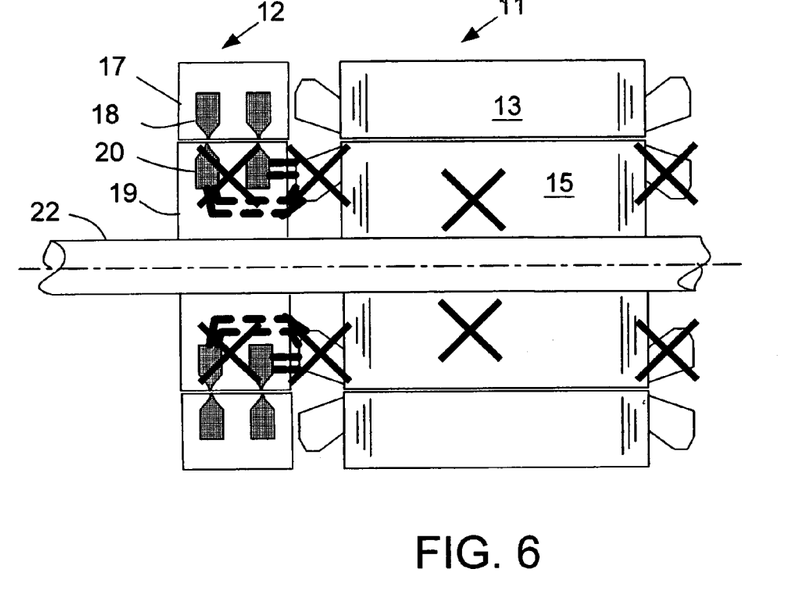
FIG. 6 is an electrical schematic view of a hybrid-secondary uncluttered machine of the prior art showing the parts that are made unnecessary by the present invention.

FIG. 6 schematically illustrates a difference between the hybrid secondary uncluttered induction machine portion used in the present invention and the hybrid secondary uncluttered machine of the prior art. In this machine, the rotor 15 of the induction machine 11 and the rotor 19 of the transformer 12 and their electrical interconnection are omitted as represented by the "X's" and a single rotor 46 for magnetically coupling energy between the machine stator and the stator coils of the transformer is added as seen in FIG. 7.

Figure 7:
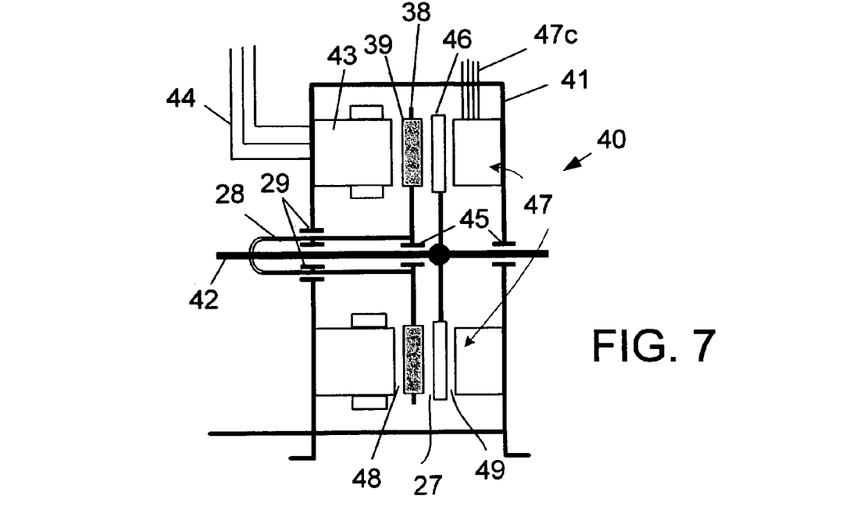
FIG. 7 is a schematic diagram of a two-phase hybrid-secondary uncluttered permanent magnet machine of the present invention.

FIG. 7 shows an example of an axial gap embodiment of the present invention. The machine 40 includes a housing 41 and a first rotor shaft 42 mounted on bearings 45 for rotation of a first, uncluttered rotor 46 in the housing 41. A second rotor 38 carrying permanent magnets 39 is positioned between a stator 43 and the first rotor 46. The second rotor 38 is mounted for rotation on a hollow shaft 28 supported by a second set of bearings 29. The stator 43 receives multi-phase electric power through lines 44 connecting to multi-turn windings. A toriodal secondary core and coil assembly 47 has peripherally disposed windings which encircle the first rotor shaft 42. A first axial air gap 48 relative to the rotor shafts, 28, 42 is located between the stator 43 and the PM rotor 38. A second axial air gap 27 is provided between the PM rotor 38 and the uncluttered rotor 46. And, a third axial air gap 49 is provided between the first rotor 46 and the secondary core and coil assembly 47. The uncluttered rotor 46 rotates with the shaft 42 and has non-contact magnetic brushes (not shown in FIG. 7) for conducting flux.

In this invention, the uncluttered rotor 46 is magnetically coupled to the PM rotor 38 instead of the armature 43. The machine 40 sees the PM rotor 38 as the rotating field. The PM rotor 38 naturally produces a flux wave that is either stationary or rotating.

Figures 8A, 8B:
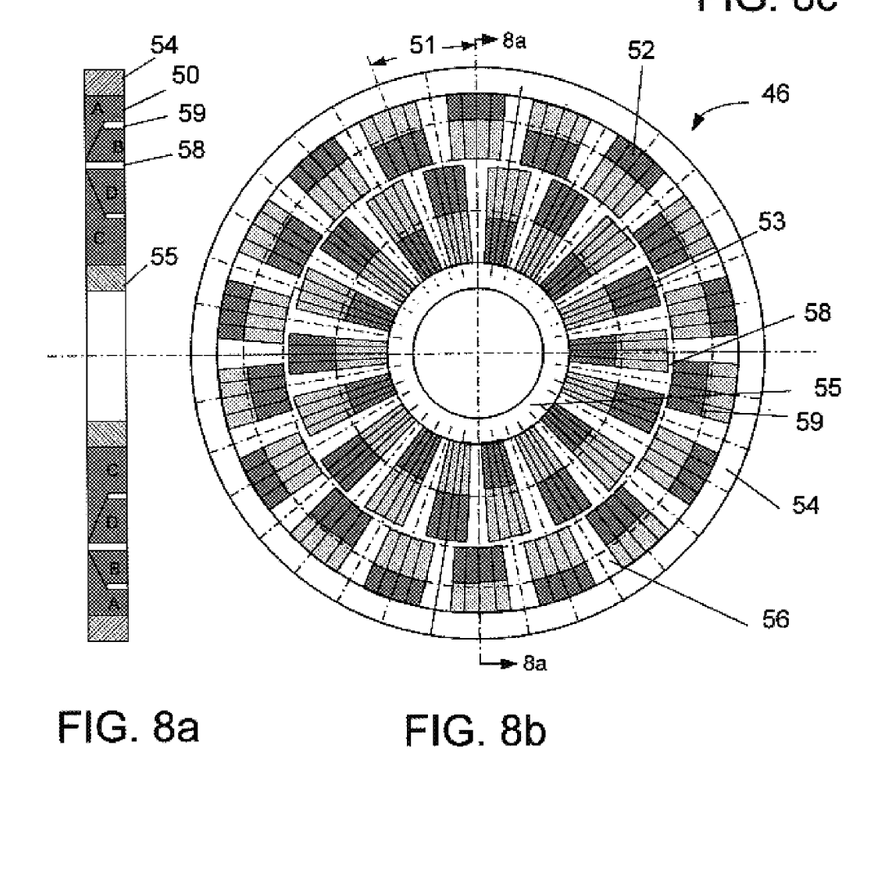
FIG. 8a is a sectional view taken in a plane indicated by line 8a—8a in FIG. 8b.
FIG. 8b is a plan view of a magnetic coupling, uncluttered rotor in the two-phase machine seen in FIG. 7.

With reference to FIGS. 8a and 8b, an n-phase flux path for the rotating air-gap flux is formed on one side of the uncluttered rotor 46 facing the PM rotor 38. On the other side of the uncluttered rotor 46, the 2*n non-continuous rings are formed by the step-up portions 50 of the magnetic brushes A, B, C and D. The n-phase secondary toroidal cores and coils 47 are coupled with the non-continuous rings for linking with the uncluttered fluxes that do not contain the rotation-frequency flux component.

The n-phase secondary toroidal coils can be connected to different components such as the variable resistors or an inverter for speed controls in a motor mode, or to the electric loads in a generator mode. The uncluttered rotor 46 and the secondary toroidal cores and coils 47 are all parts of the secondary circuit. They are in the magnetic path of the permanent magnets 39 for controlling the air-gap flux density between the stator 43 and the PM rotor 38 for the field weakening and field enhancement modes, respectively. The PM rotor 38 can be operated in a motor mode or a generator mode depending on the currents fed to the stator 43.

The PM rotor 38, the uncluttered rotor 46, and the secondary toroidal cores and coils 47 form an uncluttered slip energy machine except the PM rotor 38 is acting as an armature that produces either a rotating or a standstill flux wave between the PM rotor 38 and the uncluttered rotor 46. For example, when the PM rotor 38 is standstill, the currents in the secondary toroidal coils 47 can produce a torque between the PM rotor 38 and the uncluttered rotor 46. Under a relative rotation between the uncluttered rotor 46 and the PM rotor 38, the secondary toroidal coils 47 can act as either a generator or a motor depending on the direction of current in the coils 47.

Figure 8C:
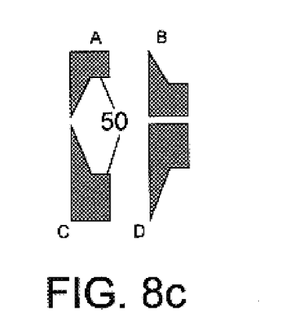
FIG. 8c is a detail view of the magnetic brushes included in the rotor of FIGS. 8a and 8b.

FIGS. 8a, 8b and 8c show the details of the first rotor 46 with magnetic brushes A, B, C and D for a 2-phase, eighteen pole device. Using symbol, n, as the number of phases of the uncluttered rotor 46, each pole pair area (i.e., two times the pole-pitch 51) of the rotor consists of 2*n (i.e., 4) groups of magnetic brushes A, B, C and D. Two inner groups C, D of these four magnetic-brush groups A, B, C and D form one phase, and two outer groups A, B, form another phase. The detail views of these four groups of flux brushes, A, B, C, and D, are shown in FIG. 8c.

The magnetic brushes A, B, C and D can be made of stacked laminations, compressed powder cores, ferromagnetic wires or other equivalent soft magnetic materials that have good magnetic permeability, a high saturation level, and low core-loss properties. The magnetic brushes A, B, C and D are secured between the non-magnetic outer ring 54 and the non-magnetic rotor hub 55. A two-phase flux path for the rotating air-gap flux is formed on one side of the rotor 46 facing the armature 43. On the other side of the rotor 46 are the step-up portions 50 (FIGS. 8a and 8b) of the magnetic brushes A, B, C and D that form four non-continuous rings. The rings are separated in a radial direction by ring-shaped gaps 58 (FIGS. 8a and 8b), which are made of material between each pair of magnetic brushes in each phase, each magnetic brush in the pair being separated on the secondary side from its counterpart magnetic brush by a ring-shaped air gap 59 (FIGS. 8a and 8b). The rings of magnetic brushes are interrupted by radial gaps 56 (FIG. 8b) between the magnetic-brush groups can be filled with non-magnetic materials. Because the summation of the opposite-polarity fluxes passing through the magnetic brushes per pole pair is zero, the boundary space of every pole pair can be made of electrically-conducting non-magnetic materials. This allows the rotor 46 to have sufficiently high mechanical strength required by certain designs. The outer ring 54 should be designed to withstand the centrifugal force of the rotor 46.

Figures 9A, 9B:
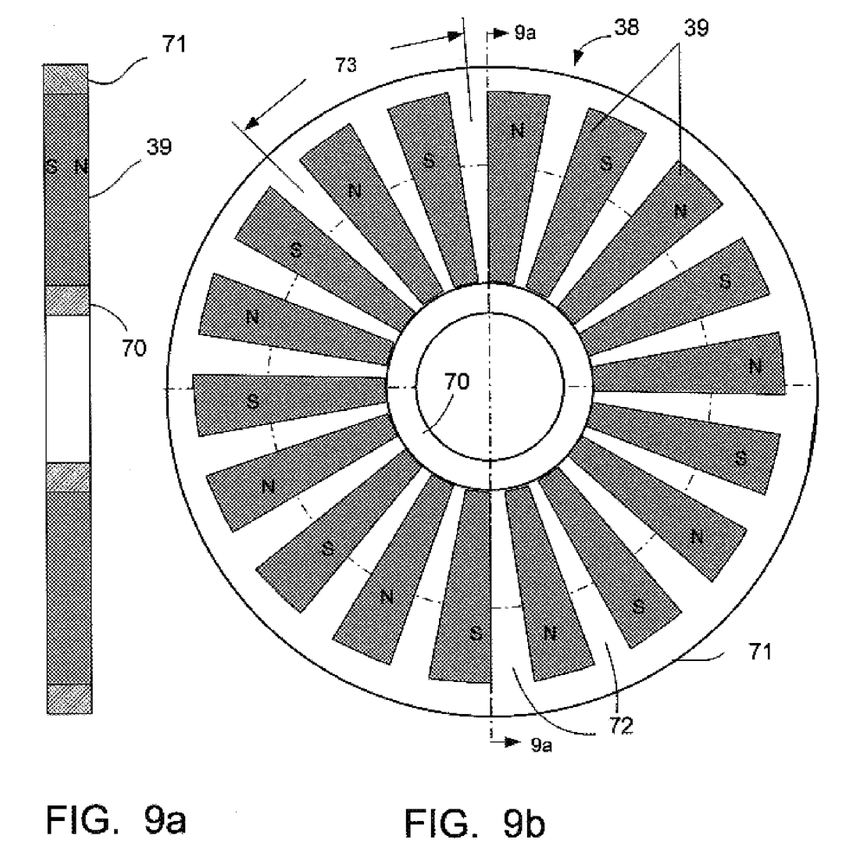
FIGS. 9a is a sectional view taken in a plane indicated by line 9a—9a in FIG. 9b.
FIG. 9b is a plan view of a permanent magnet rotor in the two-phase machine seen in FIG. 7.

FIGS. 9a–9b show the permanent magnet (PM) rotor 38 with alternating north (N) and south (S) pole permanent magnets 39, one pair per a pole-pair pitch 73. The magnets are also oriented N-S or the reverse through the thickness of the PM rotor 38 as seen in FIG. 9a. The rotor has an inner ring 70 and an outer ring 71 and radial gap portions 72 formed of non-magnetic material.

Figures 10A, 10B, 10C:
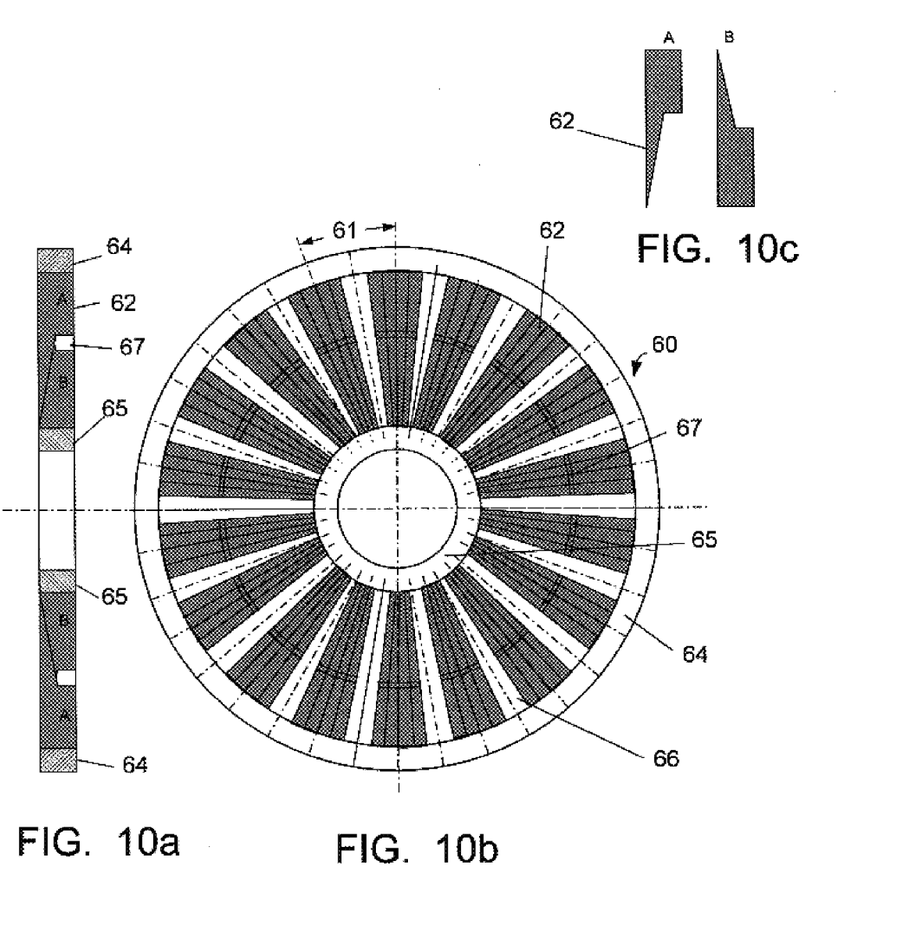
FIGS. 10a and 10b are sectional and sectional views of a rotor for a single-phase machine of the present invention.
FIG. 10c is a detail view of the magnetic brushes included in the rotor of FIGS. 10a and 10b.

FIGS. 10a–10c show a single-phase (i.e., n=1) uncluttered rotor 60 that can be used as a generator and a motor but without starting torque at standstill when it is fed by the secondary toroidal coils. The rotor 60 has pole pitch distance 61, just one ring of magnetic brushes 62 (A&B separated by space 67), an outer ring of non-magnetic material 64, an inner hub of non-magnetic material 65 and non-magnetic radial, spaced portions 66 between pole pairs forming an 18-pole rotor 60.

When the uncluttered rotor is constructed in a single-phase (i.e., n=1), the machine can be used as a generator and motor but without starting torque at standstill. The machine would produce starting torque when the uncluttered rotor is constructed for two or a higher number of phases.

Figure 11:
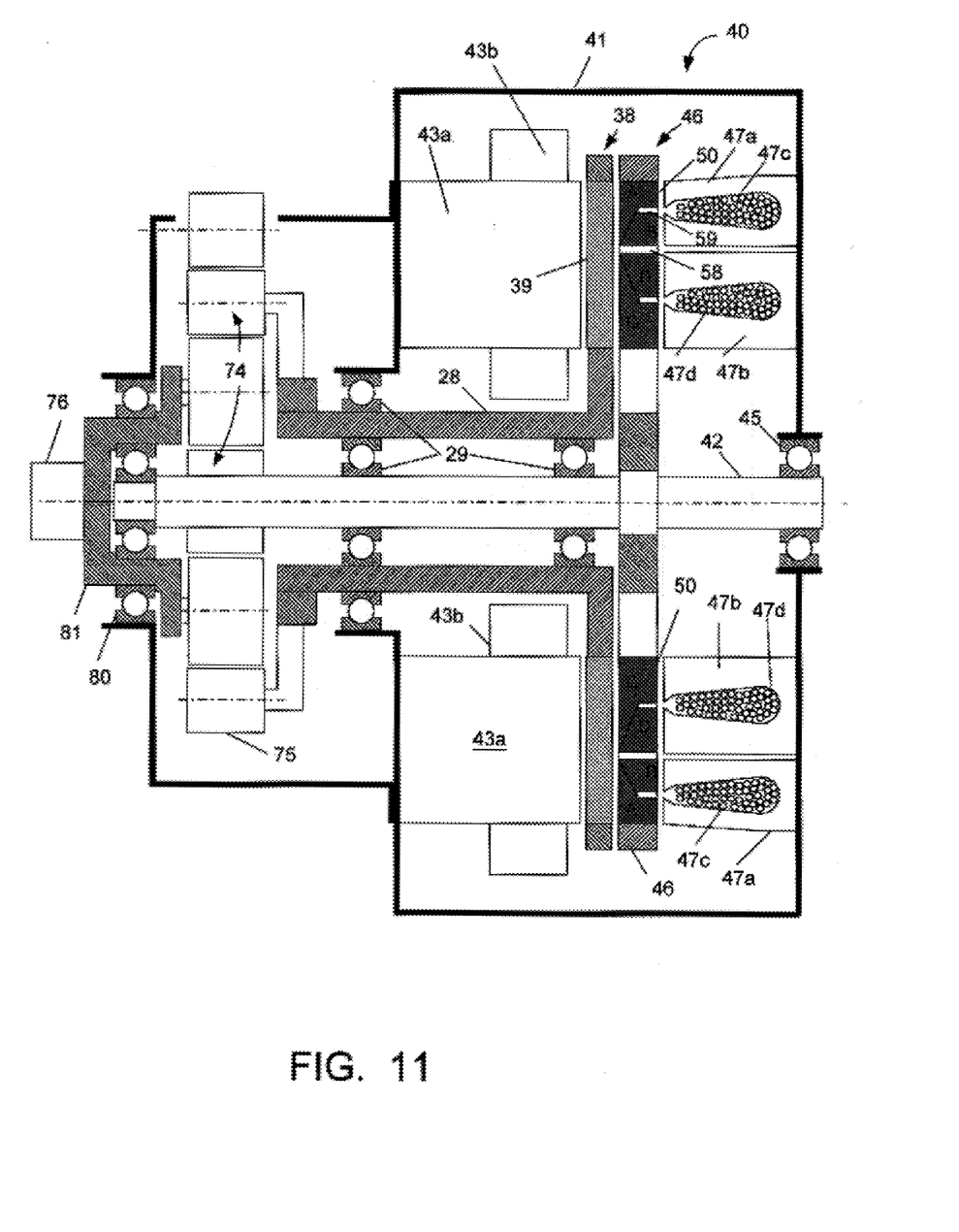
FIG. 11 is a sectional view of the machine of FIG. 7 including parts of a hybrid electric vehicle interface.

FIG. 11 shows the details of the machine 40 of FIG. 7 applied to a hybrid electric vehicle application. The stator 43 more particularly includes a stator core 43a and a multi-phase winding 43b having a plurality of turns or coils. Two secondary toroidal cores 47a, 47b and the corresponding peripherally disposed coils 47c, 47d are shown for coupling with the four non-continuous rings of magnetic brushes A, B, C and D to link with the uncluttered fluxes that do not contain the rotating-frequency flux component.

A planetary gearset 74 couples an engine shaft 76 in a vehicle to the motor shaft 42 through a rotational bearing assembly 80, 81. At least one of the gears 75 would be coupled to drive the wheels of the vehicle. The hollow shaft 28 and the bearings 29 for the PM rotor 38 are seen in more detail.

Various embodiments can be constructed according to the present invention provided that an n-phase flux path for the rotating air-gap flux is formed on one side of the uncluttered rotor 46 facing the armature 43. On the other side of the rotor, the 2*n non-continuous rings are formed by the step-up portions 50 of the magnetic brushes. The n-phase secondary toroidal cores 47a, 47b and coils 47c, 47d in FIG. 9 are coupled with the non-continuous rings for linking with the uncluttered fluxes that do not contain the rotation-frequency flux component.

The n-phase secondary toroidal coils 47c, 47d can be connected to different components such as the variable resistors or an inverter for speed control in a motor mode, or to the electric loads in a generator mode.

Figure 12:
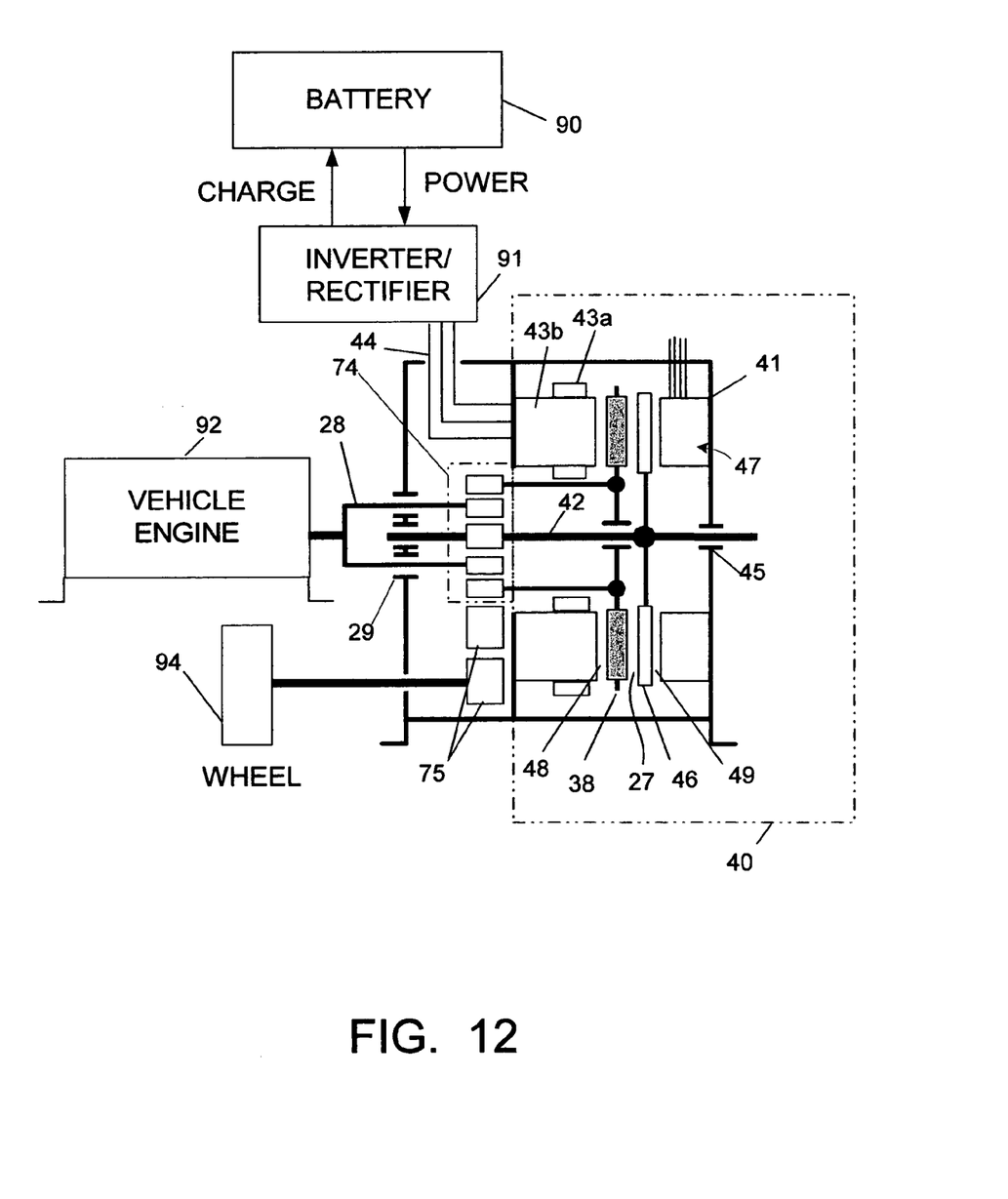
FIG. 12 is a schematic view of the machine of FIG. 7 applied to a hybrid electric vehicle application.

FIG. 12 shows the complete vehicle application with vehicle engine 92 coupled to the PM rotor 38 through the hollow drive shaft 28 and planetary gearing 74 and coupled to the uncluttered rotor 46 through the planetary gearing 74 and drive shaft 42. Also shown is the coupling of the drive mechanisms to the wheel 94 through gears 75 in the planetary gearing arrangement 74. The gearing applicable to the present invention is not limited to planetary gearing; a differential gearset with only three shafts can also be employed. A battery 90 is connected to an inverter/rectifier 91 to supply power and to be charged. The inverter/rectifier 91 controls the form of the power supplied to the stator 43a, 43b.

The invention provides a method that simplifies the earlier uncluttered induction machine by transforming the conventional rotating flux in the air gap facing the armature to an uncluttered flux (i.e., without the rotation-frequency flux component) facing the secondary toroidal cores and coils.

The uncluttered machine of the prior art cannot operate at synchronous speed because there is no induced current in the rotor at synchronous speed. The machine of the present invention can operate at synchronous speed, because a flux that includes a dc flux can be passed through the rotor at synchronous speed.

Suitable magnetic brushes can be made of materials with good permeability, high magnetic saturation level, and low core loss. Stacks of thin laminations of flux conducting materials, bundles of ferromagnetic wires, or low ac loss compressed powders are material examples for the magnetic brushes and for the secondary toroidal cores.

The machine of the present invention is ideal for the hybrid electric vehicle application, but is not limited to this application.

The invention can be used in both axial-gap and radial gap machines.

A radial gap, high-strength undiffused machine can also be provided with the present invention. The primary air gap between the rotors and the stator would be disposed a radial distance from the axis of rotor rotation. One or more secondary coil assemblies would be provided at the end of the cylindrical rotor(s) in a radial gap machine. The magnetic coupling uncluttered rotor would then be provided with magnetic brushes in a suitable pattern in place of the familiar conduction bars of an induction motor. For an example of the general machine configuration and a detailed description, reference is made to Hsu, U.S. patent application Ser. No. 10/668,586, filed Sep. 23, 2003.

This has been a description of the preferred embodiments of the invention. The present invention is intended to encompass additional embodiments including modifications to the details described above which would nevertheless come within the scope of the following claims.

I claim:

1. A method of providing slip energy control in a permanent magnet electrical machine comprising a stator and a magnet coupling uncluttered rotor provided with a plurality of elements for coupling flux to a secondary coil, the method comprising:
   inducing a flux in the magnetic coupling uncluttered rotor across a first air gap located between the stator and the magnetic coupling uncluttered rotor by conducting a current in a primary winding of the stator of the electrical machine and by positioning a permanent magnet rotor with permanent magnets in said first air gap;
   positioning the secondary coil across a second air gap from the magnetic coupling uncluttered rotor and facing the magnetic coupling uncluttered rotor; and
   inducing a slip current in the secondary coil by magnetically coupling the flux through the magnetic coupling uncluttered rotor without inducing a current in the magnetic coupling uncluttered rotor.

2. The method of claim 1, further comprising supplying a dc current in the secondary coil to produce a dc flux in the uncluttered rotor.

3. The method of claim 1, wherein the primary air gap is disposed axially along an axis of rotation for the rotor and wherein the second air gap is also disposed axially along an axis of rotation for the rotor.

4. The method of claim 1, wherein the machine is operated as an ac induction machine.

5. The method of claim 1, wherein the machine is operated as a motor.

6. The method of claim 1, wherein the machine is operated as a generator.

7. The method of claim 1, wherein a dc excitation is provided to the secondary coil for operating the machine at synchronous speed.

8. The method of claim 1, wherein a dc excitation is provided to the secondary coil for operating the machine as a brushless dc machine.

* * * * *